(12) United States Patent
Jin

(10) Patent No.: US 10,123,148 B2
(45) Date of Patent: Nov. 6, 2018

(54) METHOD AND SYSTEM FOR ENHANCING SOUND EFFECT WHEN USING VIRTUAL REALITY GLASSES

(71) Applicant: HUIZHOU TCL MOBILE COMMUNICATION CO., LTD., Huizhou (CN)

(72) Inventor: Xin Jin, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 15/503,706

(22) PCT Filed: Sep. 5, 2016

(86) PCT No.: PCT/CN2016/098023
§ 371 (c)(1),
(2) Date: Feb. 13, 2017

(87) PCT Pub. No.: WO2017/107560
PCT Pub. Date: Jun. 29, 2017

(65) Prior Publication Data
US 2018/0109902 A1  Apr. 19, 2018

(30) Foreign Application Priority Data

Dec. 23, 2015 (CN) .......................... 2015 1 0977907

(51) Int. Cl.
*H04R 5/02* (2006.01)
*H04S 7/00* (2006.01)
(Continued)

(52) U.S. Cl.
CPC .............. *H04S 7/304* (2013.01); *G06F 3/012* (2013.01); *G06T 19/003* (2013.01); *H04R 3/12* (2013.01);
(Continued)

(58) Field of Classification Search
USPC ......... 381/17, 18, 56, 61, 80, 304, 307, 309, 381/310, 380
See application file for complete search history.

(56) References Cited

U.S. PATENT DOCUMENTS

| 8,472,653 B2 * | 6/2013 | Kon ........................ H04S 1/002 381/17 |
| 2002/0164037 A1 | 11/2002 | Sekine |
| 2014/0232641 A1 * | 8/2014 | Sendai .................... G06F 3/011 345/156 |

FOREIGN PATENT DOCUMENTS

| CN | 1140968 A | 1/1997 |
| CN | 204745623 U | 11/2015 |

(Continued)

*Primary Examiner* — Yosef K Laekemariam
(74) *Attorney, Agent, or Firm* — Shimokaji IP

(57) ABSTRACT

An apparatus, method and system of enhancing a sound effect of VR glasses is disclosed. The method may include detecting angular velocity data of a turning of the VR glasses through a gyroscope sensor and detecting turning direction data of the VR glasses through a compass sensor when a user wears the VR glasses to watch video; acquiring, by a mobile terminal, the angular velocity data and the turning direction data, judging a change of the turning direction of the VR glasses using the turning direction data, controlling a change of a volume level according to the change of the turning direction, and accordingly adjusting an audio output of the mobile terminal, including volumes of left and right sound channels.

17 Claims, 2 Drawing Sheets

(51) Int. Cl.
- *H04R 3/12* (2006.01)
- *G06F 3/01* (2006.01)
- *G06T 19/00* (2011.01)
- *H04R 5/033* (2006.01)

(52) U.S. Cl.
CPC ......... *H04R 5/033* (2013.01); *H04R 2203/00* (2013.01); *H04S 2400/13* (2013.01)

(56) References Cited

FOREIGN PATENT DOCUMENTS

| | | |
|---|---|---|
| CN | 105163223 A | 12/2015 |
| CN | 105578355 A | 5/2016 |

\* cited by examiner

METHOD AND SYSTEM FOR ENHANCING SOUND EFFECT WHEN USING VIRTUAL REALITY GLASSES

TECHNICAL FIELD

This invention relates to the technical field of a VR (virtual reality) glasses, and in particular to a method and system for fast and reliably enhancing the sound effect of VR glasses, and to VR glasses.

BACKGROUND

VR glasses mean Virtual Reality Glasses. By means of a cell phone as a display, VR glasses can achieve the virtual reality function through relevant applications on the cell phone.

Generally, the sound effect of VR glasses is exhibited through the audio output of a cell phone. When a user's head turns, the sound in two sound channels does not change, and so it does not make the user feel like he/she is right in the scene and there is no enhanced reality effect of surround sound effect.

Therefore, the existing technology still needs improvement and development.

SUMMARY

A method and system for enhancing the sound effect of VR glasses is provided, and VR glasses are provided. The present invention proposes a method of using a gyroscope sensor and a compass sensor to enhance the sound effect.

In an embodiment, a method of enhancing the sound effect of VR glasses is provided, including: A. preset a gyroscope sensor for detecting an angular velocity of turning of the VR glasses and a compass sensor for detecting a turning direction of the VR glasses on the VR glasses;

B. detect the angular velocity of turning of the VR glasses through the gyroscope sensor and to detect the turning direction of the VR glasses through the compass sensor when a user is watching video by wearing the said VR glasses; and C. acquire the angular velocity data detected by the gyroscope sensor and the turning direction data detected by the compass sensor, judge changes of the turning direction of the VR glasses control changes of the volume level according to the changes of the direction, and accordingly turn up or turn down the volumes of sound of a left sound channel and a right sound channel corresponding to the audio by a mobile terminal.

In a further embodiment, the method of enhancing the sound effect of VR glasses further comprises the following step prior to Step A:

S. presetting the volume adjustment of the mobile terminal cooperating with the VR glasses to have a plurality of levels.

The method of enhancing the sound effect of VR glasses is characterized in the step C further comprises the followings:

C1. acquiring the angular velocity data detected by the gyroscope sensor and the turning direction data detected by the compass sensor, by a mobile terminal;

C2. judging the change of the turning direction of the VR glasses according to the angular velocity data detected by the gyroscope sensor and the turning direction data detected by the compass sensor, by a mobile terminal C3. when the turning direction of the VR glasses is judged to be turning left, the volume of the left sound channel is gradually turned down while the volume of the right sound channel is gradually turned up during the turning process; and C4. when the turning direction of the VR glasses is judged to be turning right, the volume of the right sound channel is gradually turned down and the volume of the left sound channel is gradually turned up during the turning process.

In a further embodiment, in the method of enhancing the sound effect of VR glasses, the step C further comprises the followings:

C5. when the turning direction of the VR glasses is judged to turn upward or downward, both the left and right sound channels are all gradually turned down during the turning process.

In the method of enhancing the sound effect of VR glasses, the step C further comprises the followings:

C6. adjusting the speed of change of a volume level curve according to the angular velocity of the VR glasses in order to adjust the speed of change of the playing volume, by the mobile terminal.

In a further embodiment, in In the method of enhancing the sound effect of VR glasses, the step C6 further comprises the followings:

controlling one-to-one correspondences between the volume adjustment and the angular velocity of turning of the VR glasses, increasing the speed of volume adjustment accordingly when the angular velocity becomes faster and decreasing the speed of volume adjustment accordingly when the angular velocity becomes slower with respect to the volume adjustment, by the mobile terminal.

In an embodiment, a system of enhancing the sound effect of VR glasses is provided, comprising pre-set module for presetting a gyroscope sensor for detecting an angular velocity of turning of the VR glasses and presetting a compass sensor for detecting a turning direction of the VR glasses, on the VR glasses;

detection control module for detecting the angular velocity of turning of the VR glasses through the gyroscope sensor and for detecting the turning direction of the VR glasses through the compass sensor when a user wears the VR glasses to watch video;

volume adjustment control module for controlling a mobile terminal to acquire the angular velocity data detected by the gyroscope sensor and acquire the turning direction data detected by the compass sensor and to judge a change of the turning direction of the VR glasses, and for controlling a change of the volume level according to the change of the direction, and accordingly turning up or turning down volumes of sound of left and right sound channels corresponding to the audio.

In a further embodiment, in the system of enhancing the sound effect of VR glasses, it further comprises volume levels setting module for presetting the volume adjustment of the mobile terminal cooperating with the VR glasses to have a plurality of levels.

In a further embodiment, in the system of enhancing the sound effect of VR glasses, the volume adjustment control module comprises:

acquisition unit for controlling the mobile terminal to acquire the angular velocity data detected by the gyroscope sensor and the turning direction data detected by the compass sensor;

judgment unit for controlling the mobile terminal to judge the change of the turning direction of the VR glasses according to the angular velocity data detected by the gyroscope sensor and the turning direction data detected by the compass sensor;

the first adjustment unit for controlling to turn down the volume of the left sound channel and to turn up the volume of the right sound channel gradually during the turning process when the turning direction of the VR glasses is judged to be turning left;

the second adjustment unit for controlling to turn down the volume of the right sound channel and to turn up the volume of the left sound channel gradually during the turning process when the turning direction is judged to be turning right.

In a further embodiment, in the system of enhancing the sound effect of VR glasses, the volume adjustment control module further comprises:

the third adjustment unit for controlling to turn down the volumes of both the right and left sound channels gradually during the turning process when the turning direction of the VR glasses is judged to turn upward or turn downward.

In a further embodiment, in the system of enhancing the sound effect of VR glasses, wherein the volume adjustment control module further comprises:

the fourth adjustment unit for controlling the mobile terminal to adjust the speed of change of a volume level curve according to the angular velocity of turning of the VR glasses so as to adjust the speed of change of playing volume.

In a further embodiment, in the system of enhancing the sound effect of VR glasses, wherein the fourth adjustment unit is specifically used for the following: controlling one-to-one correspondences between the volume adjustment and the angular velocity of turning of the VR glasses, increasing the speed of volume adjustment accordingly when the angular velocity becomes faster and decreasing the speed of volume adjustment accordingly when the angular velocity becomes slower with respect to the volume adjustment.

In an embodiment, VR glasses comprising a system of enhancing the sound effect of the VR glasses are provided, the system of enhancing the sound effect of the VR glasses comprising the followings:

pre-set module for presetting a gyroscope sensor for detecting an angular velocity of turning of the VR glasses and presetting a compass sensor for detecting a turning direction of the VR glasses, on the VR glasses;

detection control module for detecting the angular velocity of turning of the VR glasses through the gyroscope sensor and for detecting the turning direction of the VR glasses through the compass sensor when a user wears the VR glasses to watch video;

volume adjustment control module for controlling a mobile terminal to acquire the angular velocity data detected by the gyroscope sensor and acquire the turning direction data detected by the compass sensor and to judge a change of the turning direction of the VR glasses, and for controlling a change of the volume level according to the change of the direction, and accordingly turning up or turning down volumes of sound of left and right sound channels corresponding to the audio.

In a further embodiment, in the VR glasses, the system of enhancing the sound effect of VR glasses, further comprises volume levels setting module for presetting the volume adjustment of the mobile terminal cooperating with the VR glasses to have a plurality of levels.

In a further embodiment, in the VR glasses, the volume adjustment control module comprises:

acquisition unit for controlling the mobile terminal to acquire the angular velocity data detected by the gyroscope sensor and the turning direction data detected by the compass sensor;

judgment unit for controlling the mobile terminal to judge the change of the turning direction of the VR glasses according to the angular velocity data detected by the gyroscope sensor and the turning direction data detected by the compass sensor;

the first adjustment unit for controlling to turn down the volume of the left sound channel and to turn up the volume of the right sound channel gradually during the turning process when the turning direction of the VR glasses is judged to be turning left;

the second adjustment unit for controlling to turn down the volume of the right sound channel and to turn up the volume of the left sound channel gradually during the turning process when the turning direction is judged to be turning right.

In a further embodiment, in the VR glasses, the volume adjustment control module further comprises:

the third adjustment unit for controlling to turn down the volumes of both the right and left sound channels gradually during the turning process when the turning direction of the VR glasses is judged to turn upward or turn downward.

In a further embodiment, in the VR glasses, the volume adjustment control module further comprises:

the fourth adjustment unit for controlling the mobile terminal to adjust the speed of change of a volume level curve according to the angular velocity of turning of the VR glasses so as to adjust the speed of change of playing volume.

In a further embodiment, in the VR glasses, the fourth adjustment unit is specifically used for the followings:

controlling one-to-one correspondences between the volume adjustment and the angular velocity of turning of the VR glasses, increasing the speed of volume adjustment accordingly when the angular velocity becomes faster and decreasing the speed of volume adjustment accordingly when the angular velocity becomes slower with respect to the volume adjustment.

The proposed method and system for enhancing the sound effect of VR glasses and the VR glasses as well as the method of using gyroscope sensor and compass sensor to enhance sound effect make the sound effect of the VR glasses better while implementing a reality-enhancing effect with sense of immediacy and surround sound effect.

DETAILED DESCRIPTION

To make the objective, technical solution, and advantages of the invention clearer and more definite, embodiments are described with reference to the drawings for further explaining the invention below. It shall be appreciated that the specific embodiments provided here are only for explaining the invention, and not for imposing any restriction to the invention.

Figure 1:
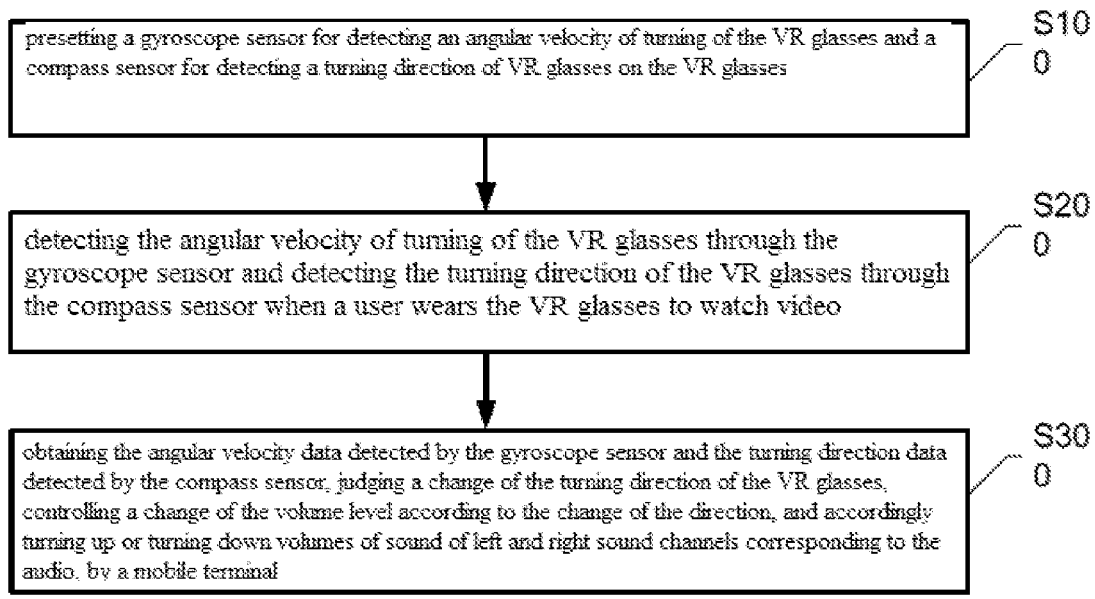
FIG. 1 depicts a flowchart of a method of enhancing the sound effect of VR glasses according to a preferred exemplary embodiment of the invention.

Referring to FIG. 1, FIG. 1 is a flowchart of a method for enhancing the sound effect of VR glasses according to a preferred embodiment of the invention. FIG. 1 shows a method of enhancing the sound effect of VR glasses which includes:

preset a gyroscope sensor for detecting an angular velocity of turning of the VR glasses and preset a compass sensor for detecting a turning direction of the VR glasses, on the VR glasses; (block S100)

In the present embodiment of the invention, one gyroscope sensor for detecting the angular velocity of turning of the VR glasses and one compass sensor for detecting the turning direction of the VR glasses are needed to be preset on the VR glasses.

The compass sensor is also called the digital compass, which has the similar principle with a mechanical compass; a magneto-resistive sensor is used to measure the earth magnetic field, and to be adjusted and calibrated in order to point to the due south (north); in this invention, preferably, a 3-axis strapdown magnetoresistive digital compass is used; this kind of compass has the following advantages: shake resistance, vibration resistance, higher course accuracy, electronic compensation for interference fields, and capable of being integrated into a control loop for data linking.

For the gyroscope sensor, the one used in a smart mobile terminal is also called angular velocity sensor; it is different from an accelerometer (G-sensor) as the physical quantity it measures is the angular velocity of turning when deflecting or inclining. In a mobile terminal, it is not possible to measure or reconstitute a complete 3D movement by only using a G-sensor, and neither can it measure the movement of turning; a G-sensor can only detect axial linear movements. A gyroscope, however, can well measure the movements of turning and deflection, and so actual movements of a user can be accurately analyzed and judged. Then, based on the movements, the mobile phone can be accordingly operated.

Besides, the volume of the mobile terminal which coordinates with the VR glasses is preset to be several levels for adjustment according to the invention; for example, six levels are set, level one is the smallest and level six is the biggest; levels are arranged in sequence.

When a user wears the VR glasses to watch video, the said gyroscope sensor detects an angular velocity of turning of the VR glasses and the said compass sensor detects a turning direction of the VR glasses. (block S200)

The gyroscope sensor can measure the angular velocity, while the compass sensor can measure the direction. By means of combination of these two sensors, directions, angular velocities and speeds of turning of the user who wears the VR glasses to watch video can be judged.

A mobile terminal acquires the angular velocity data detected by the gyroscope sensor and the turning direction data detected by the compass sensor, judges the changes of turning direction of the VR glasses, controls the changes of volume level according to the changes of direction, and accordingly turns up or turns down the volume of the corresponding left and right sound channel of the audio. (block S300)

In the embodiment of the invention, a mobile terminal acquires the angular velocity data detected by the gyroscope sensor and the turning direction data detected by the said compass sensor, and then judges the changes of turning direction of the VR glasses according to the acquired angular velocity data detected by the said gyroscope sensor and the turning direction data detected by the said compass sensor.

In case the VR glasses is judged to rotate to the left direction, then, during the turning, the left sound channel is gradually turned down while the right sound channel is gradually turned up; in case the VR glasses is judged to rotate to the right direction, then, during the turning, the right sound channel is gradually turned down while the left channel is gradually turned up.

In case the VR glasses is judged to rotate upward or downward direction, then, during the turning, both the left and right sound channels are all gradually turned down.

In the embodiment of the invention, a mobile terminal adjusts the speed of change of a volume level curve according to the angular velocity of the VR glasses in order to adjust the speed of change of the volume to be played. The mobile terminal controls the one-to-one correspondence between the volume adjustment and the angular velocity of turning of the VR glasses; for volume adjusting, the speed of adjusting volume increases accordingly when the angular velocity becomes faster and reduces accordingly when the angular velocity becomes slower.

Namely, in the embodiment of the invention, when a user turns his/her head during watching video through the VR glasses, the mobile terminal can judge the turning direction of the head through the gyroscope sensor and the compass sensor, control the change of volume level according to such direction, and accordingly turn up or turn down the volume of the left and right sound channels corresponding to the audio, thus realizing the virtual reality effect of the audio. For example, in case the head is turned to the left, during the turning process, the volume of the left sound channel gradually turns down while the volume of the right channel gradually turns up, thus having the user feel that the sound source is coming from the right front; this is consistent with the actual movement (turn left) of the user. Similarly, if the user turns his/her head to the right, the volume of the right channel turns down and the left channel turns up. If the user turns his/her head upward or downward, both channels turn down.

Figure 2:
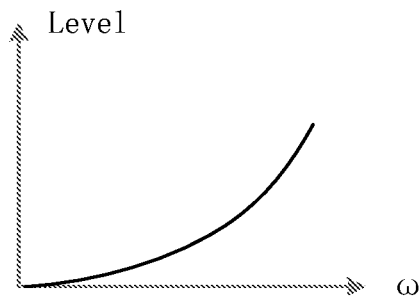
FIG. 2 depicts a diagram of the relation between a level and an angular velocity (ω) in a method of enhancing the sound effect of VR glasses according to a preferred exemplary embodiment of the invention.

Then, the speed of change of a volume level curve is adjusted according to the angular velocity of turning of the head so as to adjust the change speed of the volume to be played. The bigger the angular velocity is, the faster the volume change will be; while the smaller the angular velocity is, the slower the volume change will be. Therefore, a simple graph as shown in FIG. 2 can be used to display the relation between level and angular velocity ($\omega$).

It can be seen from the above that the present invention proposes a method of enhancing the sound effect using a gyroscope sensor and a compass sensor.

Figure 3:
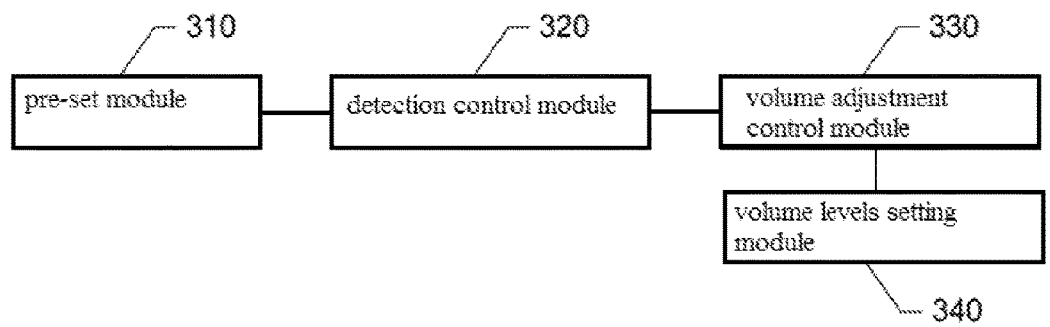
FIG. 3 depicts a functional and principle block diagram of a system of enhancing the sound effect of VR glasses according to a preferred exemplary embodiment of the invention.

Based on the above embodiment, this invention also provides a system of enhancing the sound effect of the VR glasses. As shown in FIG. 3, the said system includes:

pre-set module 310 for arranging a gyroscope sensor for detecting the angular velocity of turning of the VR glasses and arranging a compass sensor for detecting the turning direction of the VR glasses, on the VR glasses; the specific process is described as above;

detection control module 320 for detecting the angular velocity of turning of the VR glasses through the gyroscope sensor and for detecting the turning direction of the VR glasses through the compass sensor when a user is watching video by using the VR glasses; the specific process is described as above;

volume adjustment control module 330 for controlling a mobile terminal to acquire the angular velocity data detected by the gyroscope sensor and the turning direction data detected by the compass sensor and to judge the change of turning direction of the VR glasses, and for controlling the change of volume level according to the change of direction, and accordingly turning up or turning down the volumes of the corresponding left and right sound channels of the audio; the specific process is described as above;

volume levels setting module 340 for presetting volume adjustment of the mobile terminal cooperating with the VR glasses to be several levels; the specific process is described as above.

In the system for enhancing the sound effect of the VR glasses, the volume adjustment control module includes:

acquisition unit which is used for controlling a mobile terminal to acquire the angular velocity data detected by the gyroscope sensor and the turning direction data detected by the compass sensor; the specific process is described as above;

judgment unit which is used to for controlling a mobile terminal to judge the change of turning direction of the VR glasses according to the angular velocity data detected by the gyroscope sensor and the turning direction data detected by the compass sensor; the specific process is described as above;

the first adjustment unit which is used for controlling to turn down the volume of the left sound channel and to turn up the volume of the right sound channel gradually during the turning process when the VR glasses is judged to be turning left direction;

the second adjustment unit which is used to for controlling to turn down the volume of the right sound channel and to turn up the volume of the left channel gradually during the turning process when the VR glasses is judged to be turning right direction; the specific process is described as above.

In the system of enhancing the sound effect of the VR glasses, the volume adjustment control module further includes: the third adjustment unit which is used for turning down the volumes of both the right and left sound channels gradually during the turning process when the VR glasses is judged to turn upward or turn downward; the specific process is described as above.

The fourth adjustment unit which is used to for controlling the mobile terminal to adjust the speed of change of a volume level curve according to the angular velocity of turning of the VR glasses so as to adjust the speed of change of the volume to be played.

Specifically, the fourth adjustment unit controls the one-to-one correspondence between the volume adjustment and the angular velocity of turning of the VR glasses; for volume adjusting, the volume adjustment speed increases accordingly when the angular velocity becomes faster and reduces accordingly when the angular velocity becomes slower.

Figure 4:
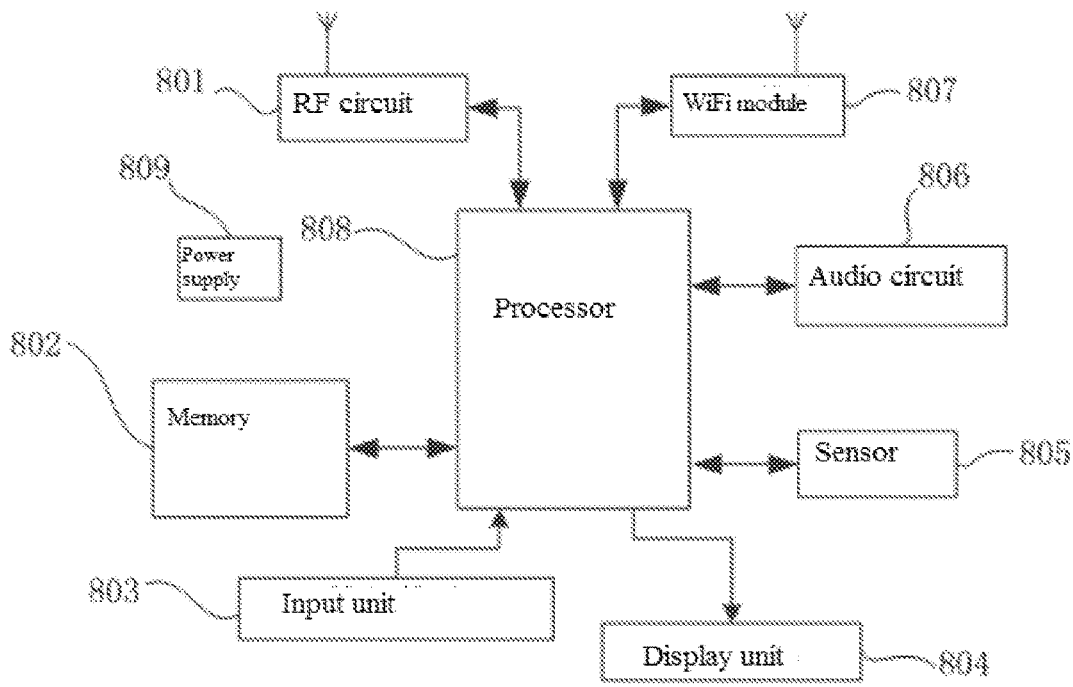
FIG. 4 depicts a schematic diagram of hardware modules of VR glasses according to an exemplary embodiment of the present invention.

Based on the above embodiment, the present invention provides one kind of VR glasses for carrying out the above method of enhancing the sound effect of the VR glasses and/or for operating the system of enhancing the sound effect of the VR glasses; as shown in FIG. 4, the VR glasses includes:

Radio Frequency (RF) circuit 801, one or more memories of computer readable media 802, input unit 803, display unit 804, sensor 805, audio circuit 806, wireless fidelity module 807, processors 808 including one or more than one processing cores, power supply 809 and other components. Those skilled in the art can understand that the terminal structure as shown in FIG. 4 does not limit the terminal, and it can include more or less components than what is shown in the figure, is combined with some components or has different component arrangements.

Wherein, the sensor 805 includes: a gyroscope sensor for detecting the angular velocity of turning of the VR glasses and a compass sensor for detecting the turning direction of the VR glasses.

The proposed method and system for enhancing the sound effect of the VR glasses and the VR glasses as well as the method of using a gyroscope sensor and a compass sensor to enhance sound effect make the sound effect of the VR glasses better while displaying a reality-enhancing effect with the sense of immediacy and surround sound effect; the details are described as above.

Those skilled in the art can understand, all and part of the procedures in the above embodiments can be realized by commanding related hardware (such as processor, controller, etc.) through computer program; the procedure can be stored in storage media which can be read by computer; in implementing the procedure, the above procedures of each method embodiment can be included. Wherein the storage media can be a memory, diskette, CD, and others.

It shall be noted that the application of the invention is not limited to the examples listed above; those skilled in the art can make improvement or modification according to the above description, while all these improvements and modifications shall be within the protection scope of the claims of the invention.

The invention claimed is:

1. A method of enhancing a sound effect of VR glasses, comprising:

presetting, by the VR glasses, a gyroscope sensor for detecting an angular velocity of turning of the VR glasses and a compass sensor for detecting a turning direction of the VR glasses;

detecting angular velocity data through the gyroscope sensor and detecting turning direction data of the VR glasses through the compass sensor when a user wears the VR glasses to watch video; and acquiring, by a mobile terminal, the angular velocity data and the turning direction data, judging a change of the turning direction of the VR glasses using the turning direction data, controlling a change of a volume level according to the change of the turning direction, and accordingly adjusting an audio output of the mobile terminal, including a volume of a left sound channel and a volume of a right sound channel; and adjusting, by the mobile terminal, a speed of the change of the volume level via a curve according to the angular velocity of the VR glasses.

2. The method of enhancing the sound effect of VR glasses as claimed in claim 1, wherein prior to the presetting, the method further comprises:

presetting the adjusting of the audio output of the mobile terminal cooperating with the VR glasses to have a plurality of levels.

3. The method of enhancing the sound effect of VR glasses as claimed in claim 1, wherein when the turning direction of the VR glasses is judged to be turning left, the volume of the left sound channel is gradually turned down while the volume of the right sound channel is gradually turned up during a turning process of the VR glasses; and when the turning direction of the VR glasses is judged to be turning right, the volume of the right sound channel is gradually turned down and the volume of the left sound channel is gradually turned up during the turning process.

4. The method of enhancing the sound effect of VR glasses as claimed in claim 1, wherein
when the turning direction of the VR glasses is judged to turn upward or downward, both the left and the right sound channels are gradually turned down during a turning process of the VR glasses.

5. The method of enhancing the sound effect of VR glasses as claimed in claim 1, further comprising:
controlling, by the mobile terminal, one-to-one correspondences between the adjusting of the audio output and the angular velocity of turning of the VR glasses, increasing the speed of the change of the volume level accordingly when the angular velocity becomes faster and decreasing the speed of the change of the volume level accordingly when the angular velocity becomes slower.

6. A system of enhancing the sound effect of VR glasses comprising processors configured to:
preset, by the VR glasses, a gyroscope sensor for detecting an angular velocity of turning of the VR glasses and preset a compass sensor for detecting a turning direction of the VR glasses;
detect angular velocity data through the gyroscope sensor and detect turning direction data of the VR glasses through the compass sensor when a user wears the VR glasses to watch video;
acquire, by a mobile terminal, the angular velocity data and the turning direction data and judge a change of the turning direction of the VR glasses using the turning direction data, and control a change of a volume level according to the change of the turning direction, and accordingly adjusting an audio output of the mobile terminal, including a volume of a left sound channel and a volume of a right sound channel; and
adjust, by the mobile terminal, a speed of the change of the volume level via a curve according to the angular velocity of turning of the VR glasses.

7. The system of enhancing the sound effect of VR glasses as claimed in claim 6, wherein the processors are further configured to preset the adjusting of the audio output of the mobile terminal cooperating with the VR glasses to have a plurality of levels.

8. The system of enhancing the sound effect of VR glasses as claimed in claim 6, wherein the processors are further configured to:
turn down the volume of the left sound channel and to turn up the volume of the right sound channel gradually during a turning process of the VR glasses when the turning direction of the VR glasses is judged to be turning left; and
turn down the volume of the right sound channel and to turn up the volume of the left sound channel gradually during the turning process when the turning direction is judged to be turning right.

9. The system of enhancing the sound effect of VR glasses as claimed in claim 6, wherein the processors are further configured to:
turn down the volumes of both the right and the left sound channels gradually during a turning process of the VR glasses when the turning direction of the VR glasses is judged to turn upward or turn downward.

10. The system of enhancing the sound effect of VR glasses as claimed in claim 7, wherein the processors are further configured to:
control, by the mobile terminal, one-to-one correspondences between the adjusting of the audio output and the angular velocity of turning of the VR glasses, increase the speed of the change of the volume level accordingly when the angular velocity becomes faster and decreasing the speed of the change of the volume level accordingly when the angular velocity becomes slower.

11. VR glasses enhancing a sound effect of the VR glasses, the VR glasses comprising processors configured to:
preset a gyroscope sensor for detecting an angular velocity of turning of the VR glasses and preset a compass sensor for detecting a turning direction of the VR glasses;
detect angular velocity data through the gyroscope sensor and detect turning direction data of the VR glasses through the compass sensor when a user wears the VR glasses to watch video;
control a mobile terminal to acquire the angular velocity data and acquire the turning direction data and to judge a change of the turning direction of the VR glasses using the turning direction data, and controlling a change of a volume level according to the change of the turning direction, and accordingly causing the mobile terminal to adjust an audio output of the mobile terminal, including a volume of a left sound channel and a right sound channel; and
control the mobile terminal to adjust a speed of the change of the volume level via a curve according to the angular velocity of turning of the VR glasses.

12. The VR glasses of claim 11, wherein the processors are further configured to:
preset the adjusting of the audio output of the mobile terminal cooperating with the VR glasses to have a plurality of levels.

13. The VR glasses of claim 11, wherein the processors are further configured to:
turn down the volume of the left sound channel and to turn up the volume of the right sound channel gradually during a turning process of the VR glasses when the turning direction of the VR glasses is judged to be turning left;
turn down the volume of the right sound channel and to turn up the volume of the left sound channel gradually during the turning process when the turning direction is judged to be turning right.

14. The VR glasses of claim 11, wherein the processors are further configured to:
turn down the volumes of both the right and the left sound channels gradually during a turning process of the VR glasses when the turning direction of the VR glasses is judged to turn upward or turn downward.

15. The VR glasses of claim 11, wherein the processors are further configured to:
control the mobile terminal to control one-to-one correspondences between the adjusting of the audio output and the angular velocity of turning of the VR glasses, increase the speed of the change of the volume level accordingly when the angular velocity becomes faster and decreasing the speed of the change of the volume level accordingly when the angular velocity becomes slower.

16. The method of claim 5, wherein the curve is a logarithmic curve.

17. The VR glasses of claim 11, wherein the curve is a logarithmic curve.

* * * * *